Nov. 22, 1966  L. L. BERNHEIM  3,286,804
EXTENSIBLE AND RETRACTABLE DELIVERY TUBE ASSEMBLY
Filed Aug. 24, 1965  2 Sheets-Sheet 1
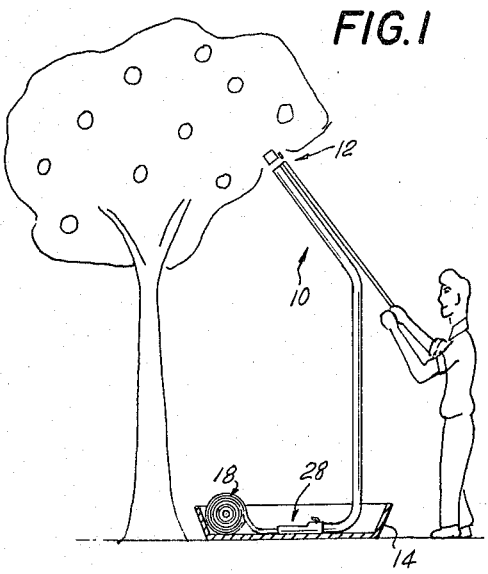
FIG.1
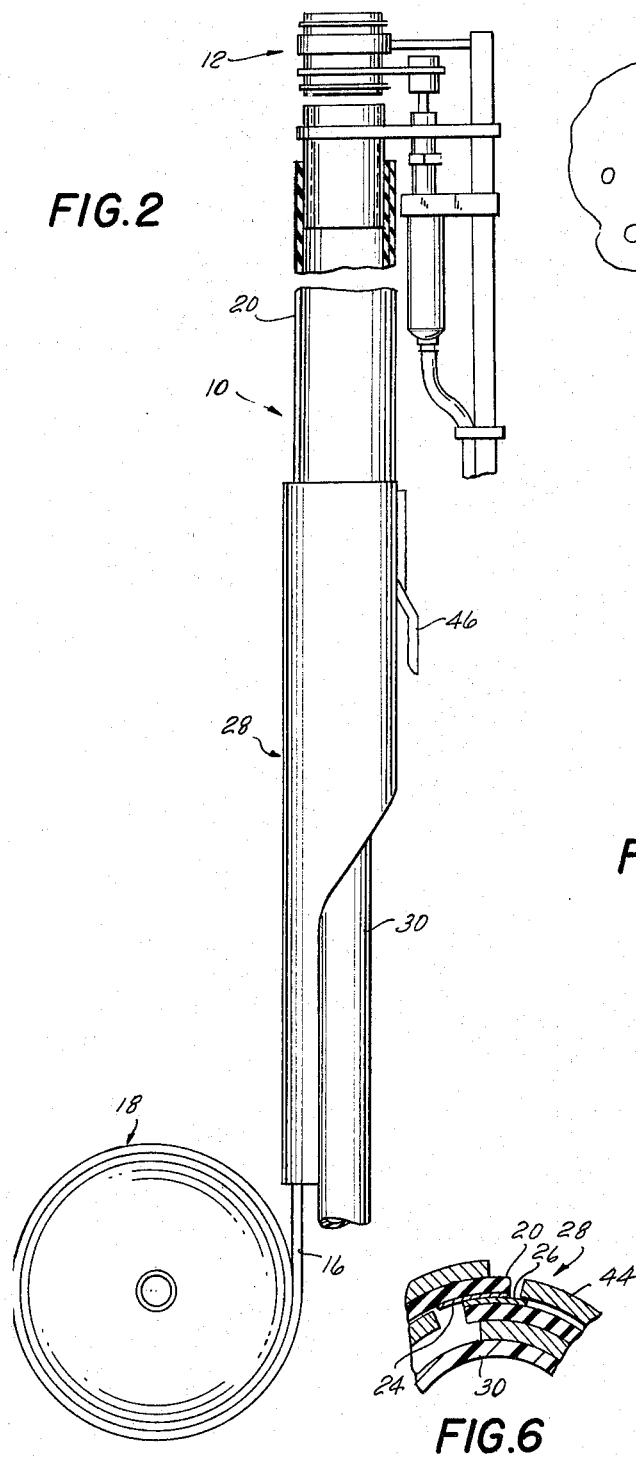
FIG.2
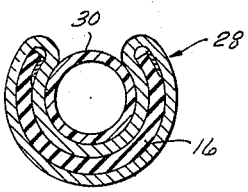
FIG.5
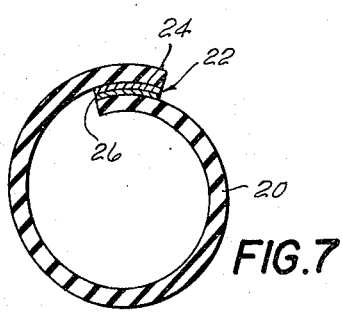
FIG.6
FIG.7
INVENTOR
LOUIS L. BERNHEIM
BY
Kane, Dalsimer & Kane
ATTORNEYS Nov. 22, 1966  L. L. BERNHEIM  3,286,804
EXTENSIBLE AND RETRACTABLE DELIVERY TUBE ASSEMBLY
Filed Aug. 24, 1965  2 Sheets-Sheet 2

INVENTOR
LOUIS L. BERNHEIM
BY
Kane, Dalsimer & Kane
ATTORNEYS 3,286,804
**EXTENSIBLE AND RETRACTABLE DELIVERY
TUBE ASSEMBLY**
Louis L. Bernheim, 2660 Mira Vista Drive,
Richmond, Calif.
Filed Aug. 24, 1965, Ser. No. 482,140
7 Claims. (Cl. 193—7)

The present invention relates to a delivery tube adapted to be extended and retracted to permit relatively constant and direct flow within the tube from various points of origin or points of discharge.

Although the present invention has wide application to many fields requiring the delivery of discrete objects and articles to liquids and fluids, the present description will be concerned primarily with a single embodiment and application in the field of fruit picking. In fruit picking it will be readily apparent that the fruit will be located on different parts of the tree and at different elevations above the ground. Mechanized automatic picking devices, particularly of the type disclosed in my prior Patent No. 2,968,907 granted on January 24, 1961, require the picking head to be lifted and directed to the fruit at diverse locations. Under these circumstances, the delivery tube which directs the fruit from the picking head to the collection site, will vary in effective length above the ground surface. In the prior art where automatic picking devices were proposed, the length of delivery tube was constant and usually provided with a maximum value to traverse the maximum contemplated distance between the average high point of the fruit location and the ground surface. Naturally, if a value lower than this were selected, the fruit would then be required to drop from the lower discharge end of the tube to the collection site in an unsupported manner thereby increasing the danger of damaging or bruising the fruit. Where a delivery tube of maximum length was employed, it will be self-evident that the entire weight and length of the tube was required to be handled even though the fruit and picking site was below the maximum picking elevation including that which the lower branches of the fruit tree was located. Under these circumstances, direct delivery of the fruit from the picking head to the collection site would be seriously hampered; and clogging of the tube oftentimes occurred.

It is therefore a principal object of this invention to eliminate the aforenoted disadvantages of prior art delivery tubes and provide a tube capable of being readily extended and retracted to thereby hold at a minimum the weight and length of tube required to be manipulated and carried between the point of origin and the point of discharge.

Another object is to provide a tube of this type whereby the gravity flow of the materials or products to be delivered therethrough may be effectively employed to provide direct and uninterrupted flow through the tube from the point of origin to the point of discharge and at any distance between these two points.

A further object is to provide a tube of this type which presents a relatively smooth interior throughout its variable length thereby permitting efficient and laminar flow of the material being delivered.

Still another object is to provide a tube of this type which permits the interior surface thereof to be easily exposed for clearing and cleaning during or following use.

In accordance with the exemplary embodiment described and illustrated in detail herein, the retractable tube is formed of elongated sheet material supplied from a roll which may incorporate means for urging the sheet material to retract back on to the roll. The web of the sheet material leading from the supply roll passes through a flattener which operates to transform the flat sheet into a tubular configuration and conversely, the tubing into a flat configuration. A forming and receiving tube is adapted to receive the sheet material in tubular configuration as it leaves the flattener. The marginal side edges of the sheet material are provided with cooperating fastening means which secure the marginal side edges to thereby retain the tubular configuration of the sheet material once it is produced. The forming and receiving tube may also include an operator mechanism actuating the fastening means to secure the marginal side edges as the tubing is transformed from the flat sheet and also to release the fastening means when the flat sheet is transformed from the tubing. In this manner a delivery tube in accordance with this invention having particular application to fruit picking may be extended and retracted at the desire and selection of the operator to pick the individual fruit at any location on a tray with a minimum of effort and damage to the fruit.

Other objects and advantages will become apparent from the following detailed description which is to be taken in conjunction with the accompanying drawings illustrating an exemplary and somewhat preferred embodiment of the invention in which:

FIG. 1 is a reduced elevational view of the delivery tube shown associated with a fruit-picking head manipulated by an operator during a fruit-picking operation.

FIG. 2 is an enlarged fragmentary elevational view with certain parts broken away and removed, showing the delivery tube associated with the fruit-picking head.

FIG. 5 is a cross-sectional view taken along the line 5—5 of FIG. 3.

FIG. 6 is an enlarged fragmentary sectional view taken along the line 6—6 of FIG. 3.

FIG. 7 is a cross-sectional view taken along the line 6—6 of FIG. 3, showing the tubing and fastened marginal side edges.

Figure 3:
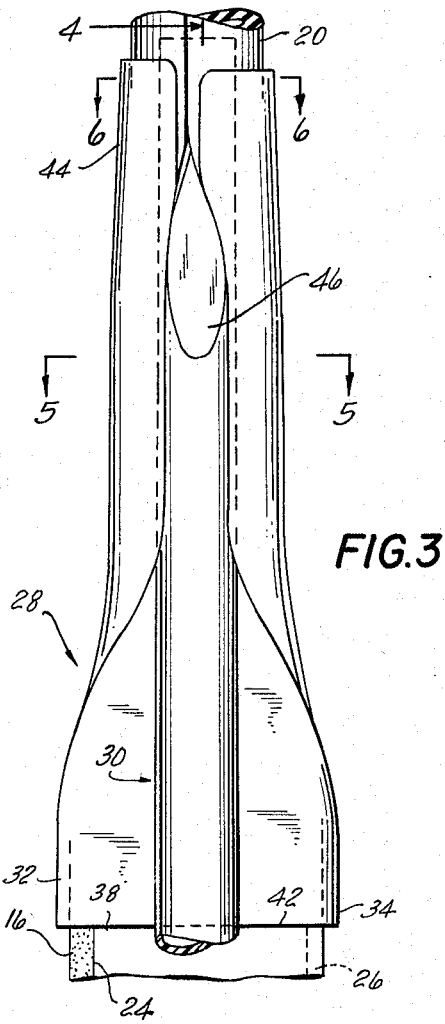
FIG. 3 is an enlarged fragmentary elevational view of the flattener and receiving and forming tube shown associated with the tubing material.
Figure 4:
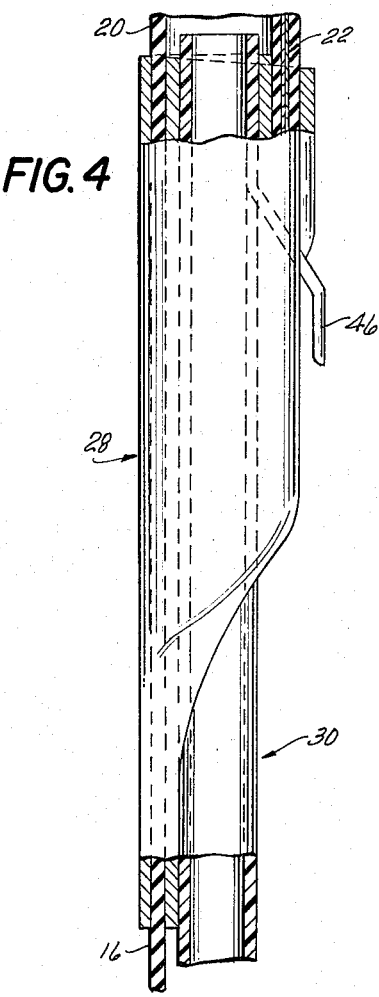
FIG. 4 is a similar elevational view partly in section viewed along the line 4—4 of FIG. 3.
Figure 8:
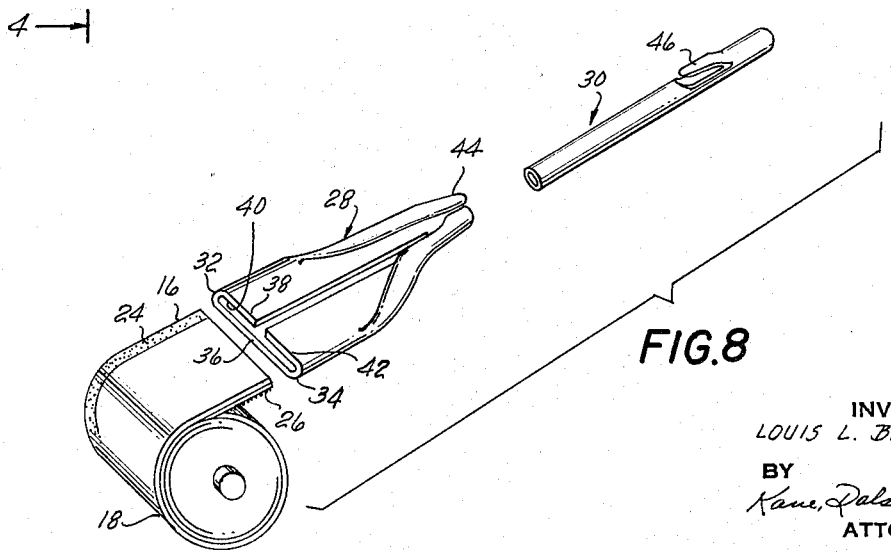
FIG. 8 is an exploded perspective view of the web and source of sheet material, flattener and forming and receiving tube of the illustrated embodiment.

In the drawings the delivery tube 10 of this invention is shown associated at one end to a fruit-picking head 12, which may be of the type disclosed in my Patent No. 2,928,907, granted January 24, 1961. This picking device operates automatically to grip and remove selected fruit on a fruit tree. The other end of the delivery tube, in accordance with this particular application, will be associated with a collecting bin or receptacle 14 within which the picked fruit is directed and stored during the picking operation.

The delivery tube can is initially supplied in web from 16, extending from a roll 18 and then advantageously formed into the essentially elongated cylindrical tubing configuration 20. The latter configuration is releasably retained by means of an interposed fastening means 22, extending between the marginal side edges 24 and 26 of the tubing material. This transformation from sheet form to tubular form and vice versa is advantageously produced by means of a cooperating flattener 28 and forming and receiving tube 30. The flattener may assume the form illustrated in which sheet material of suitable form is bent upon itself and then formed to provide opposed edges 32 and 34 and opposed sides 36 and 38, which define a passageway 40. This passageway is essentially of flat configuration at the inlet end 42 of the flattener 28 for conveniently receiving the web 16. Thereafter the flattener is formed into substantially tubular shape at the other end 44 while retaining the internal passageway 40 through which the web 16 emerges in the configuration of the tube 20. The tubing 20 as it emerges from the flattener 40 passes over the forming and receiving tube 30 which assures the retention of the desired tubular configuration. By the same token this tube serves to assure trouble-free release of the fastening means 22 as the tube 20 is retracted and reverted back to the flat web 24. In addition, the tube 30 advantageously operates as an extension of the tube 20 for purposes of conveying the material being delivered or transported to the tube to the desired location.

In the illustrated embodiment of the invention a Velcro type of fastening means 22 is illustrated. This type of fastening means is well known and readily available on the commercial market. In this connection, Velcro fasteners and information pertaining thereto may be obtained from the Velcro Corporation of New York City, New York. According to the supplier, Velcro is a nylon tape fastener consisting of two strips of nylon tape. One strip (the hook or male section) is covered with a myriad of stiff little hooks; the other strips (the pile or female section) is covered with thousands of tiny, soft loops. When pressed together, the hooks and loops engage, creating an adjustable, highly versatile and secure closure. To open, it is simply peeled apart. To facilitate this, the forming and receiving tube 30 may be provided with an operator 46 in the form of a lateral extension disposed between the side edges 32 and 34 of the flattener 28. When other forms of fastening means 22 are employed, the operator 46 may cooperate in actuating and releasing the fastening means as would be the case with the typical slide fastener. Of course it should be understood that suitable interconnecting structure is provided between the flattener and the tube to maintain the desired relative and spaced apart relationship.

In accordance with the particular application the tubing material is selected so that its length will be sufficient to extend over the maximum distance from point of origin to point of discharge. Sufficient additional length of material may prove necessary to complete the coupling of parts and the like. This sheet material will be of a width pi times the diameter of the ultimately desired tubing plus sufficient additional width to permit overlapping or securing the marginal side edges by means of the selected joining or fastening devices employed. Fastening devices usable with this invention may encompass slide fasteners or zippers, pressure type of fasteners, permanent magnets, the illustrated Velcro fastener or any other joining device which has the characteristic of ease of combination and release at a selected or fixed point.

Any flexible type of flat material that can be rolled on a drum may be used with this invention. Such materials may embrace natural or synthetic fibers, artificial and natural or organic resins or the like or any combination of such materials.

The drum 18 will of course be selected of suitable diameter and length and should be adapted to rotate both clockwise and counterclockwise about an axis at right angles to the axis of the receiver. This drum 18 may be hand or mechanically operated and may, if desired, be under spring tension to automatically keep the tube taut at all times and facilitate retraction thereof.

In operation the forward or free edge of the flat web 16 is drawn off the roll 18 through the flattener 28 which operates to turn and form this material into substantially tubular configuration. The marginal side edges 24 and 26 of the web 16 will have approached each other so that the selected joining or fastening means will operate to secure these edges together. In this connection the particular joining device or operator 46 will cooperate to join these edges in a secure manner as the material is being drawn. As stated, a key will be employed in the case of a zipper or a pressure applicator will be employed in the case of a nylon or plastic joiner or a magnetic type of fastening construction. To facilitate the joining operation, the forming and receiving tube 30 is employed and is adapted to be disposed partly in the tubing 20 with the remainder thereof beyond the leading edge of the flattener 28. Under the circumstances the web 16 passes through the flattener 28 where it is laterally bent into a tube shape and as the material passes over the forming tube 30 and at the point at which it passes through the operator 46 it becomes a tube. The receiving and forming tube may either be a one-piece tubing construction or a two-piece construction in which one is affixed to the other whereby the sheet material to be conveyed will be eventually disposed about the receiving tube. If the tube is to be used for liquids or gases or materials under pressure, it will be necessary to provide a sliding type of joint between the forward outside edge of the forming tube and the sliding interior surface of the tubing 20. The entire delivery tube assembly can be mounted upon a cart or other transportable construction so that the extension of the tube will take place from any fixed point of origin or discharge to any variable place of origin or discharge as the need is indicated or, as in the case of fruit picking, the discharge or receiver end can itself be mounted on a receptacle and the whole be portable to permit assembly of items from numerous points for transport in a receptacle. With a spring type of retraction mechanism in the drum or roller 18, constant tension may be maintained upon the tubing as it is extended so that a direct line between the receiver and the extended end of the tube 20 is maintained. If it is desired not to maintain a constant tension a ratchet type can be used upon the drum 18. Complete powered rotation of the drum could be indicated for some size tubes. Mechanical boosters may also prove useful for particular applications.

In the case of the formation of a pressure type of tube 20 the outside surfaces of the forming tube 30 located internally of the tube 20 will be so constructed and arranged to form a pressure seal between the juncture of these tubes. Ordinarily the forming tube 30 will project into the tube 20 beyond the point where the tube 20 is formed as it comes out of the flattener 28. Where a key is used to make tube 20 the key will be affixed to the forming tube 30 as the operator 46. The web of sheet material coming from the flattener 28 will pass in and out of the key thereby forming the tube 20. The tube 20 will then pass around the former 30 for a short distance before finally leaving the forming tube.

It should be understood that many diverse applications of the instant invention are contemplated. Among the several uses are included the delivery of chemical and catalytic agents from sundry points to central mixing; delivery of waste products that have been pumped from a sump in portable operation; transfer of liquids or other materials from ship to ship, airship to airship, dock to ship, etc. or varying points of receiving delivery are often involved; delivery of fluid concretes with the instant application is extremely significant because it permits the cleaning of the tubing material when it is retracted and opened up into flat form; and for many other transporting of liquids, solids or gases.

Although a single somewhat preferred embodiment of the invention has been disclosed and described in detail herein, it should be understood that this invention is in no sense limited thereby and its scope is to be determined by that of the appended claims.

I claim:
1. An extensible and retractable delivery tube assembly comprising:
   a web of substantially flat elongated sheet material having opposed marginal side edges;
   supply means for supplying said web;
   a length of tubing of said sheet material extending integrally from said web;
   releasable fastening means for securing the marginal side edges of the length of tubing;

flattener and forming means for receiving the flat sheet and forming it into the tubing and for receiving the tubing and forming it into the flat sheet, the flattener and forming means including a flattener which receives the flat sheet material and forms it into the tubing when the tubing is pulled away from the supply means and receives the tubing and forms it into the flat sheet material when the tubing is pulled towards the supply means, the flattener including an elongated member having opposed sides which define a space therebetween of sufficient dimension to receive the flat web material at one end thereof and conform to the shape thereof and receive the tubing at the other end thereof and conform to the shape thereof;
and means for selectively varying the effective length of said length of tubing.

2. The invention in accordance with claim 1 wherein said fastening means is a Velcro fastener.

3. The invention in accordance with claim 1 wherein the flattener and forming means includes a tube about which the length of tubing is adapted to be placed upon transformation from the flat web to assure the securement of the marginal side edges by the fastening means.

4. The invention in accordance with claim 3 wherein the tube is provided with a structure for actuating the fastening means to secure the marginal side edges as the tubing is transformed from the flat sheet and to release the fastening means when the flat sheet is transformed from the tubing.

5. The invention in accordance with claim 1 wherein the flattener and forming means includes a tube about which the length of tubing is adapted to be placed upon transformation from the flat web to assure the securement of the marginal side edges by the fastening means.

6. The invention in accordance with claim 5 wherein the tube is provided with a structure for actuating the fastening means to secure the marginal side edges as the tubing is transformed from the flat sheet and to release the fastening means when the flat sheet is transformed from the tubing.

7. The invention in accordance with claim 1 wherein the flatener and forming means includes a tube about which the length of tubing is adapted to be placed upon transformation from the flat web to assure the securement of the marginal side edges by the fastening means, said tube being adapted to serve as an extension of said tubing and thereby direct the material delivered therein to a selected location.

References Cited by the Examiner
UNITED STATES PATENTS

| | | | |
|---|---|---|---|
| 1,532,767 | 4/1925 | Little | 193—25 X |
| 2,253,604 | 8/1941 | Blain | 193—25 X |
| 2,747,932 | 5/1956 | Volk | 239—1 |
| 3,005,480 | 10/1961 | Slechta | 29—200 |
| 3,011,502 | 12/1961 | Jordan. | |
| 3,019,813 | 2/1962 | Dommann. | |

EVON C. BLUNK, *Primary Examiner.*

A. LEVINE, A. C. HODGSON, *Assistant Examiners.*